June 3, 1952 M. R. PRICE 2,599,283
SCREW AND SCREW HOLD APPLYING MACHINE
FOR ACOUSTICAL TILE AND THE LIKE
Filed July 26, 1950 6 Sheets-Sheet 1

FIG-1

INVENTOR.
MANLEY R PRICE
BY
ATTORNEY

INVENTOR.
MANLEY R. PRICE
BY George M. Soule
ATTORNEY

UNITED STATES PATENT OFFICE 2,599,283

SCREW AND SCREW HOLD APPLYING MACHINE FOR ACOUSTICAL TILE AND THE LIKE

Manley R. Price, Lakewood, Ohio, assignor to The Celotex Corporation, Chicago, Ill., a corporation of Delaware Application July 26, 1950, Serial No. 175,943

16 Claims. (Cl. 144—32)

The principal object of the invention is to provide a machine and apparatus for enabling the preparation of acoustical and other tile and the like for attachment by screws to walls and ceilings, by the use of which machine and apparatus the usual difficult and time taking operation of inserting the screws one by one into the tile at the time of final placement for attachment may be avoided.

Another object is to provide a machine and apparatus for preparing for attachment by screws relatively frangible tile, for example mineral acoustical tile, such that permissible sized heads of the screws cannot be depended upon as the main or sole means for supporting the tile in place. The problem is one of lack of sufficient crush resistance on the part of the tile material, particularly when the tiles are subjected to vibration over long periods of time, to prevent the screw heads from working their way through the tile thus failing to support it. Subject solution (indicating a more specific object) is to insert screw-retaining tabs, hereinafter usually called inserts, into the tile which tabs serve either to increase the effective tile-retaining shoulder areas of the screw heads or as screw-thread-engaging elements which take over the function usually performed by the shoulder or under surfaces of screw heads.

Other objects include provision of: a machine for starting screws accurately into acoustical tile having a uniform geometrical arrangement of sound-absorption and/or screw receiving sockets in a manner to effect accurate initial placement of the screws in reference to the sockets (e. g. approximate centering in the case of round sockets) so that the sockets can effectively conceal the screw heads from view when the tile are finally attached by the screws; a machine for accurately starting a full complement of attaching screws at each operation on a tile, although to variable depths as required by variations in tile thickness, and a machine by the use of which a single operator with perhaps one helper can maintain a supply of prepared tile for far more efficient erection and attachment by a crew of other operators than would otherwise be possible (net operator-time gain) and with far less tendency to damage the decorative or protective finish of the tile.

A further object is to provide a machine for the uses generally indicated above having a simple and efficient mechanism for temporarily holding the work (tile) against displacement transversely of its principal plane during insertion of the screws, which mechanism will not interfere with placement and removal of the work and will so apply the necessary holding force to the work as to protect it from destructive strains.

A specific object is to provide a form of screw-holding, preferably metallic, insert for mineral or other relatively frangible tile, which insert is adapted to be driven into the tile approximately parallel to its main faces; is stiff enough to penetrate the tile by forced insertion edgewise of the insert; can be easily penetrated by screws, and is well adapted to be propelled without likelihood of jamming from a storage magazine by a feed slide mechanism whereby an adequate supply of inserts can be made available for continued efficient operation in preparing the tile for final placement.

A concomitant object is to provide a novel and efficient screw-hold-insert magazine and feed slide mechanism for a tile-attaching-screw-setting machine.

Various other and more sepcific objects will become apparent from the following description of the illustrative form of machine and mechanisms (adaptation particularly for handling perforated mineral acoustical tile) shown in the accompanying drawings, wherein:

Fig. 6 is an enlarged sectional assembly view, taken on line 6—6 Fig. 1, showing one insert feed slide and its magazine and one screw driving spindle and its cooperating screw guide, Fig. 6a being an enlarged detail sectional view taken at right angles to Figure 6 of a spindle and tool connection.

Fig. 12 is an enlarged fragmentary view, partially in section of the top portion of the feed slide, showing an insert being projected from the magazine.

Fig. 13 is an enlarged section taken on line 13—13 of Fig. 6.

Figure 1:
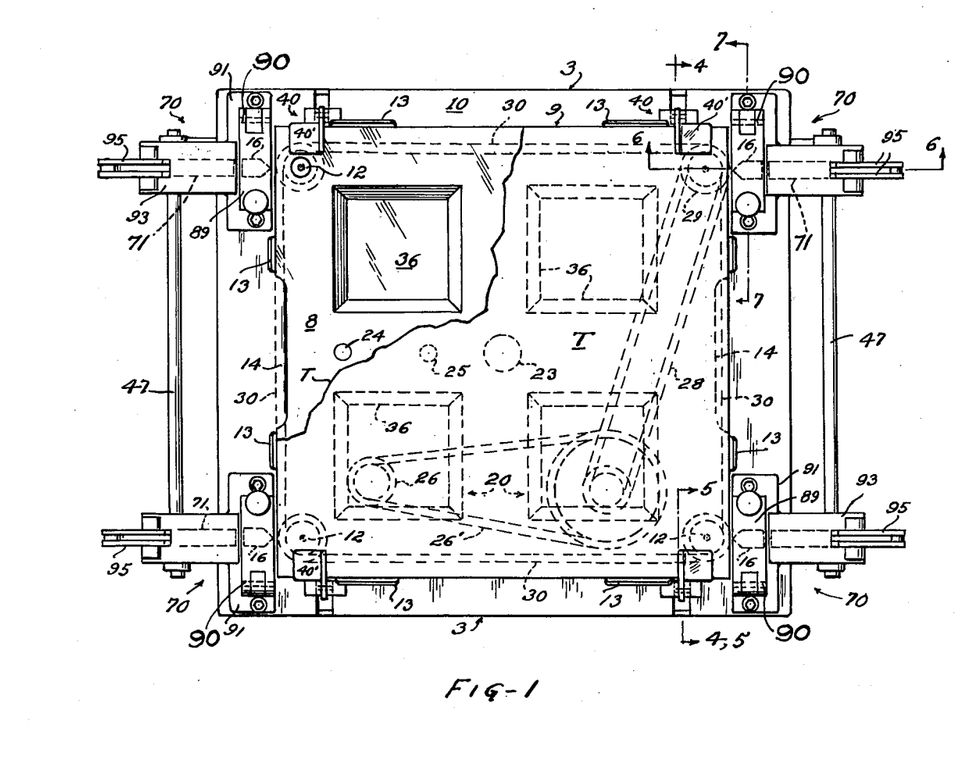
Fig. 1 is a plan view of the machine showing a portion of a tile in place on its support.
Figures 4, 5:
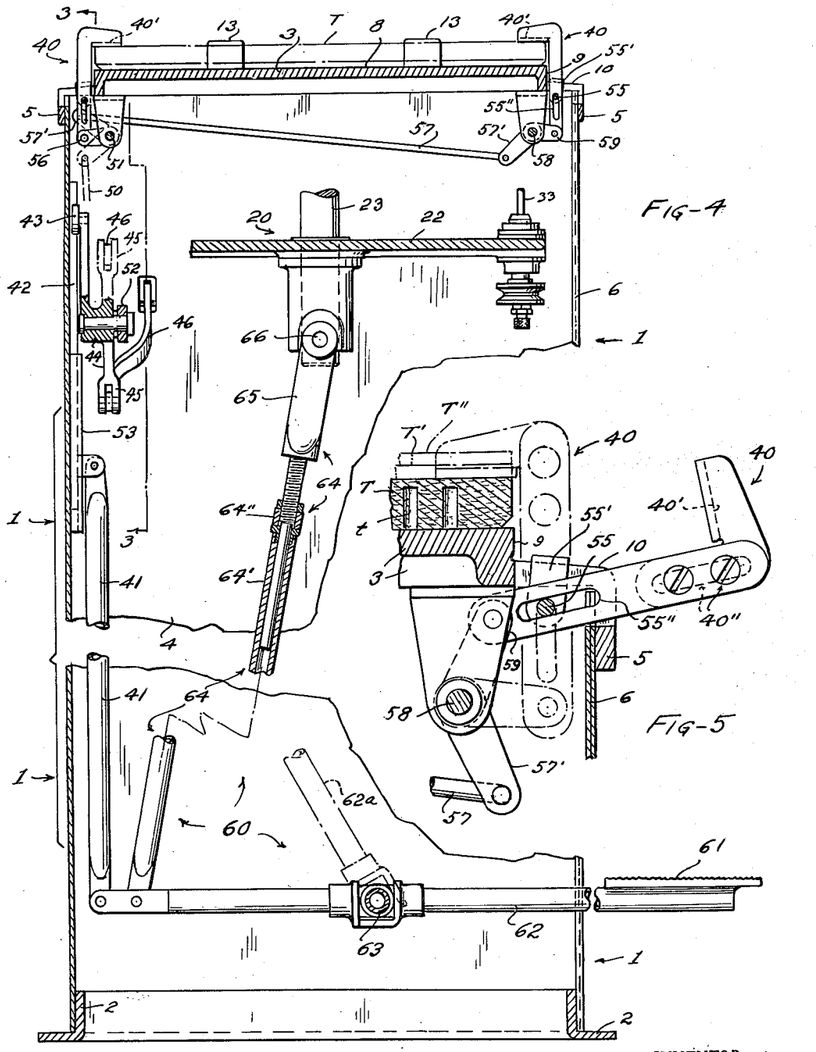
Fig. 5 is a detail enlarged scale sectional view taken on line 5—5 Fig. 1, showing one of a set of work clamping devices so modified as to enable adjustment for tile thickness variations.

The machine, as shown particularly by comparison of Figs. 1 and 4, has a hollow support-body or column 1 including a pedestal or floor rest 2 formed of angle iron or the like and a work table or top plate (e. g. aluminum casting) 3. The table 3 is solidly connected to a main supporting frame section 4 around a depending continuous flange 5 of the table, said section 4 being for example a single piece of light weight sheet metal of rectangular box-like form open at the front by reason of the vertical marginal portions of the piece being doubled back on themselves to form stiff front flanges 6, 6′ generally exposing the interior of the body. The table has a smooth raised planar top surface or plateau 8 approximately the exact overall size and shape of the tile T, a major part of one tile being shown as resting on the table, perforate face downward. The table is stepped at 9, 10 similarly all around the top or plateau surface 8, the flange 5 being part of step portion 10.

To locate the tile with certain ones (t′) of its perforations t (Fig. 6) in registration with the four screw and screw driver guides 12 (Fig. 1) the table 3 has a set of upstanding tongues 13 distributed around its four margins and fastened to the step "riser" surfaces 9. The upper margins of the various tongues are flared outwardly to assist in guiding the tile properly into working position. At each side of the table (Fig. 1) the plateau 8 may be intersected by a horizontally elongated indentation 14 to assist the operator in reaching under the tile with his or her fingers after the tile has received its complement of inserts and screws. The indentations complement the bevel surfaces t″ of the tile (Fig. 2) when such are provided as is usual in assisting the operator to remove the finished work.

Figures 6, 6A, 12, 13:
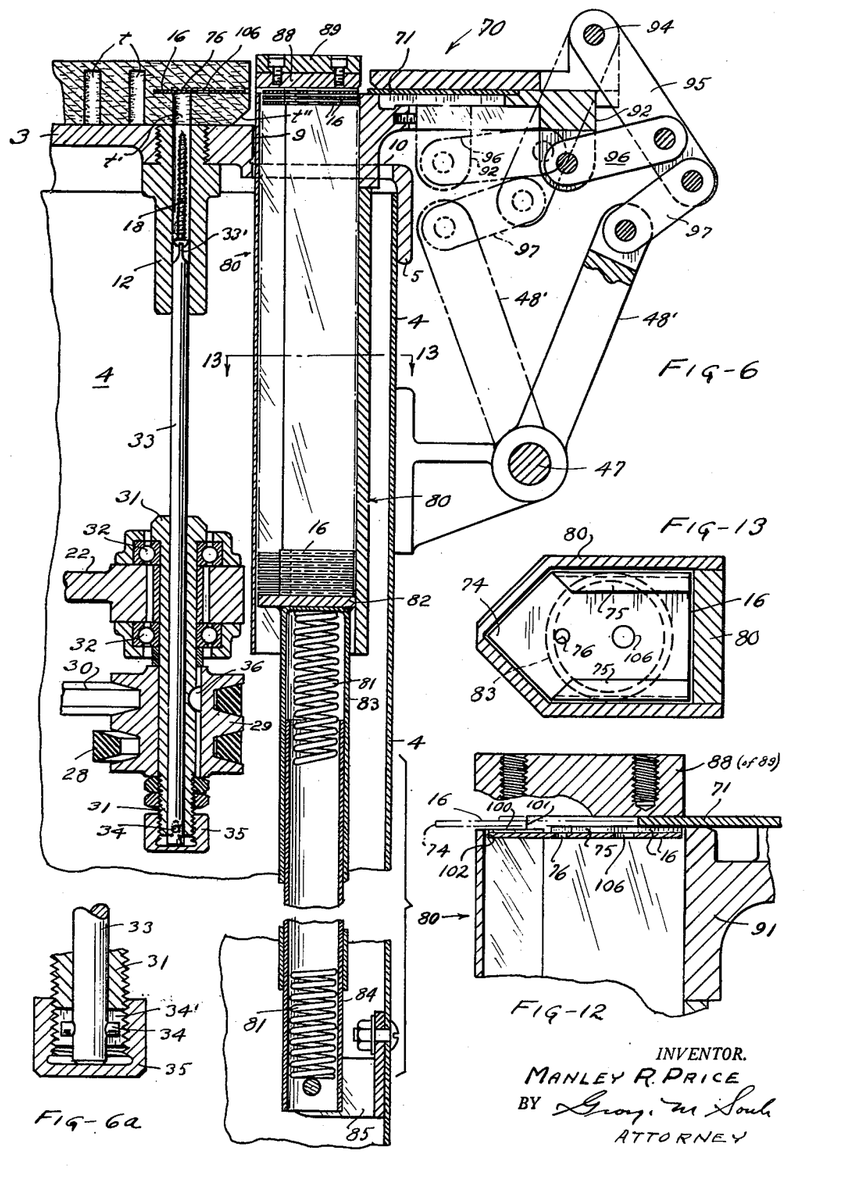
Figure 7:
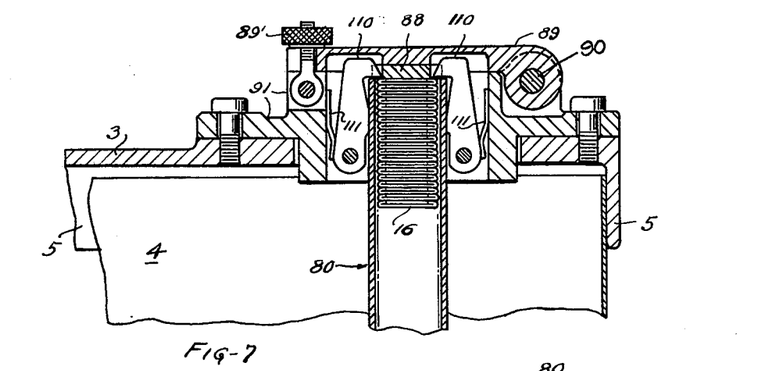
Fig. 7 is a fragmentary sectional detail view of the upper portion of the magazine etc. as indicated on Fig. 6.

The screw holding inserts (best shown in Figs. 8 to 13) are indicated at 16 in various views, and one of the complete set (not shown) of four screws is exhibited at 18 Fig. 6. Unless the tile is of frangible nature (e. g. mineral tile) the inserts 16 are not usually required. Commonly used cane or bagasse fiber structures employed as the tile material are tough enough so that there is no likelihood of the screw heads pulling through the tile. Thus the basic operation of the machine is to start the screws 16 into the tile with their points nearly therethrough (not illustrated) in readiness for application of the tile to a wall or ceiling by suitable screw driver tools.

The spindle and power mechanism as a whole is designated 20. The tile hold-down or position-retaining devices 40, Figs. 1, 2, 3 and others, are always operated to tile-retaining positions before the screws are inserted; but the magazine feed slide mechanism 70 may be suitably temporarily disconnected or, if no inserts 16 are to be used, then perhaps omitted from the machine.

The hold-down devices 40 can be operated directly by the feed slides (as by constituting parts thereof adapted to slip horizontally over the tile as the inserts 16 are driven thereinto, not illustrated). Preferably however the hold-down devices 40 swing over the tile and press downwardly thereon close to the regions of application of the screws thereto. Said devices 40, as will be more fully described later are operated directly by the treadle and cam mechanism 60 (Figs. 3 and 4 or alternate mechanism 160, Figs. 14 and 15) which works the feed slides to drive the inserts 16 into place and then elevates the power unit mechanism 20 to drive the screws. Thereby the means to hold the tile in place are operated in any event as required for screw-driving reactance. Incidentally, with the specific tile-hold-down device arrangement shown, the tile are more certainly subjected to direct reactance force thus opposing the direction of insertion of the screws into the tile as will be brought out more clearly later.

Figure 2:
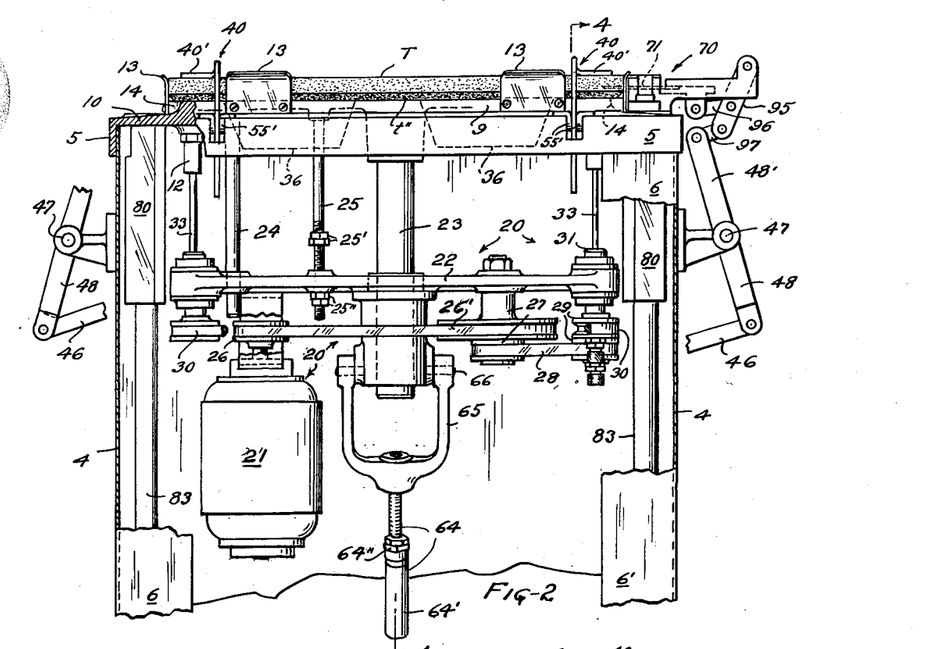
Fig. 2 is a front-side elevation of the principal working parts of the machine including an electrical power and transmission mechanism for a set of four screw driving spindles, portions of the main framework of the machine and other parts being broken away and shown in section.

Power unit 20, Figs. 1 and 2, comprises in part an electric motor 21 suspended from a chassis frame casting 22 guided in part by a sturdy vertical center stub 23 and in part by a stabilizing rod 24, both slidably engaging the chassis frame and rigidly connected to the top plate or casting 3 by suitable means. Vertical movement of the chassis is limited by adjustable abutments 25′ and 25″ on a rod 25 depending from the casting 3 through the chassis. Pulley 26 on the motor shaft drives a belt 26′, in turn driving a speed reduction double sheave 27 which, through a belt 28, drives a double sheave 29 the upper element of which is one of a set of four spindle-connected pulleys encompassed by a belt 30 so that all the tool spindles are simultaneously driven at uniform speed and in the same direction.

Preferably the four spindles 31 (see Fig. 6, one only being fully shown) have anti-friction bearing assemblies 32 of generally known construction supporting the spindles for free rotation in fixed axial relation to the chassis. The screw driver tools 33 have key connections comprising cross pins 34 (Fig. 6a) in downwardly open diametral slots 34′ of the spindles 31 and with threaded retainer caps 35 permitting individual axial adjustment of the tools 33 with reference to the chassis if necessary. The sheaves or pulleys are all suitably keyed to the spindles 31 as suggested at 36, Fig. 6.

The four screw and screw driver guides 12 are threaded into the table casting 3 from below and the tools 33 slide and turn easily in the guide bores. The bores in cooperation with the screw-slot-engaging upper ends 33′ of the tools 33 form upwardly open sockets each of which, prior to placement of the tile on the plateau surface 8, receives by hand or otherwise a screw 18. Such may be supplied from convenient supply receptacles 36 formed as top recesses in the table casting as shown in Figs. 1 and 2. For greater speed of operation on successive tile the screws can be automatically fed one-by-one into positions aligned with the screw driver tools. Several different types of magazine feed devices to supply screw drivers are already known.

The screw driver tools 33 and associated parts—stroke limiting abutment 25' Fig. 2 and others—operate essentially in the manner explained in my patent Reissue 23,201 February 28, 1950, which is to say that when the screws are driven to the desired depth or distance into the tile the screw heads slip off the tools.

The treadle mechanism 60 (Fig. 4), mainly includes a foot rest 61 and lever 62 pivoted on a cross shaft 63 suitably supported by the body sides, operates through an adjustable connecting rod 64 and yoke 65 pivoted to the chassis 22 at 66 to elevate the chassis hence the screw driver tools the proper distance to start the screws into the tile T. The same treadle motion could, if desired, effect turning of the screw driver tools as by the well known "Yankee" (T. M.) spiral screw driver principle. That, however, would require an unnecessary drain on operator energy since suitable electric power is always available in or about buildings, vehicles etc. when ready for acoustical treatment.

Figure 3:
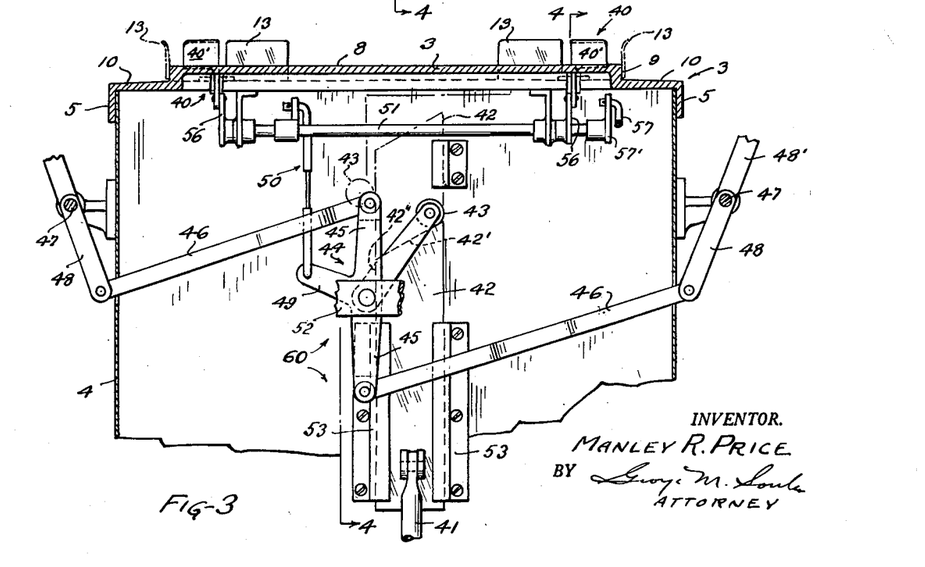
Figs. 3 and 4 are vertical sectional views taken respectively on line 3—3 of Figure 4 and on line 4—4 of Figure 2, principally illustrating one form of treadle actuated mechanism for operating in proper sequence a plurality of tile insert feed slides and a power drive mechanism for the screw driving spindles, so that the inserts are completely positioned before the screws reach the insert locations.

The treadle lever 62 as shown in full lines in Fig. 4 (62a indicating a folded-in position for shipment etc.) is approximately midway of its full stroke, the first part of which stroke has operated the insert-feed slide mechanisms 70 and hold down devices 40 as will be explained later. During such first part of the treadle stroke it is assumed that a telescoping portion 64' of the connecting rod 64 has been brought into contact with an adjustable abutment portion 64'' of the rod but without having elevated the chassis 22, thus insuring that the inserts 16 will have been fully driven into place in the tile before the points of the screws 18 arrive at the planes of the inserts. The same essential operation might be accomplished by providing deeper effective guides for the screws and, concomitantly, a lower starting position for the power unit chassis 22; but in any event (unless separate means, e. g. treadle mechanisms, are provided for operating the feed slides etc. and for advancing the screw drivers) the machine must have a suitable means to cause cessation of operation of the feed slides etc. prior to the time the points of the screws 18 reach the positions of respective inserts 16. For example:

Referring particularly to Figs. 3 and 4, the treadle mechanism 60 is seen to be connected by a push rod 41 to a cam plate 42 the upper inclined end surface 42' of which bears on a roller 43 of a unitary rocker lever 44. The lever 44 has paired arms 45 connected by operatively identical links 46 to respective rockshafts 47 as through levers 48 which operate the feed slides 70 for the inserts 16. Another arm 49 of the rocker lever 44 operates the tile-hold-down devices 40 through a flexible link 50 connected to a rockshaft 51 suspended from the table 3 as clearly shown by Figs. 3, 4 and 5. The rocker lever 44 may be conveniently supported by a bracket 52 attached to the rear wall of the body of the machine (extra heavy rear wall being shown) as are the guides 53 for the cam plate 42.

When the cam plate 42 is raised by the treadle to an extent such that the roller 43 of the rocker lever 44 rides against the vertical edge 42'' of the cam plate the treadle operation obviously transmits no further motion to the tile-hold-down devices or the feed slides but, by virtue of taking up of the lost motion in the push rod 64, now becomes effective to elevate the power unit 20 and its rotating screw driver tools.

The tile-hold-down devices 40 as shown by Figs. 3, 4 and 5 are inverted L-shaped levers having running pivotal connections with the machine framework. As shown (see Fig. 5) short pins 55 supported between paired, depending brackets 55' secured to respective step portions 10 of the work table engage respective slots 55'' in the shanks of the L-shaped levers.

In Fig. 3 and at the upper left, Fig. 4, the rockshaft 51 is seen to be connected to the depending shanks of the associated devices 40 by lever arms 56 operative to swing those devices 40 inwardly over the work as the rockshaft is turned counterclockwise (Fig. 4). Additionally the rockshaft 51 has a motion-reversing arm and link connection 57, 57' with a similar rockshaft 58 at the front of the machine. The rockshaft 58, by arms 59 thereon similar to the arms 56 of rockshaft 51, simultaneously swings each of the forwardly disposed hold-down devices 40 as from the solid-line-illustrated position Fig. 5 into the broken-line-illustrated position corresponding to those of all the hold-down-devices as shown by Figs. 1, 2 and 4.

As can be understood with reference to Figs. 1 and 5, the pad portions 40' of the devices 40 first swing above the tile clear thereof due to the running pivots 55—55'' and then move downwardly against the tile to clamp its corner portions firmly in place against the table surface 8. Since the tile thickness varies (usually in ⅛'' steps as diagrammatically indicated at T' and T'' Fig. 5) it is advisable to make the shanks of the hold-down devices 40 adjustable as suggested more or less conventionally at 40'', Fig. 5 only.

The screw-holding-insert feed slides 70 are identical and one feed slide and associated magazine are shown in considerable detail in Figs. 6, 7, 8 and 12. Each feed slide includes a pusher or feed plate 71 connected for operation by the rockshafts 47 when the levers 48 thereof are swung to the Fig. 2 illustrated positions. Fig. 2 incidentally exhibits the actual positional relationship of the tile-hold-down devices 40 and feed slide pusher plates 71 which, for greater clarity of detail are not properly coordinated in Fig. 1. (The tile-hold-down devices 40 are swung back—per Fig. 5, solid lines—when the pusher plates are retracted, although that is not necessarily the most desirable sequence of operation. The hold-down devices could be arranged so as to be fully seated on the tile before the slides operate to propel the inserts 16 into the tile.)

The screw holding inserts 16 as already mentioned are preferably of metal, sheet aluminum being a satisfactory metal from a manufacturing as well as a functional viewpoint. Each insert may be sharply pointed as at 74, Fig. 13, and each has doubled-over, parallel side flanges 75, see Figs. 8 and 9. The flanges increase the effective stiffness over that of the original metal stock and double the over all thickness of the insert so that it is unlikely to jam in the feed guide when the insert metal is burred or slightly deformed. At the same time the main body or web of each insert is thin enough to be readily penetrated by the tile-attaching screws 18 even without the assistance of pilot holes such as 76 for receiving the screw points.

The shanks of the screws 18 are preferably threaded clear to their heads so that when finally driven into tile-attaching positions the screw threads adequately support the tile through the intermediary of the inserts even though the heads may not be driven into contact with the inserts.

Figures 8, 9, 10, 11:
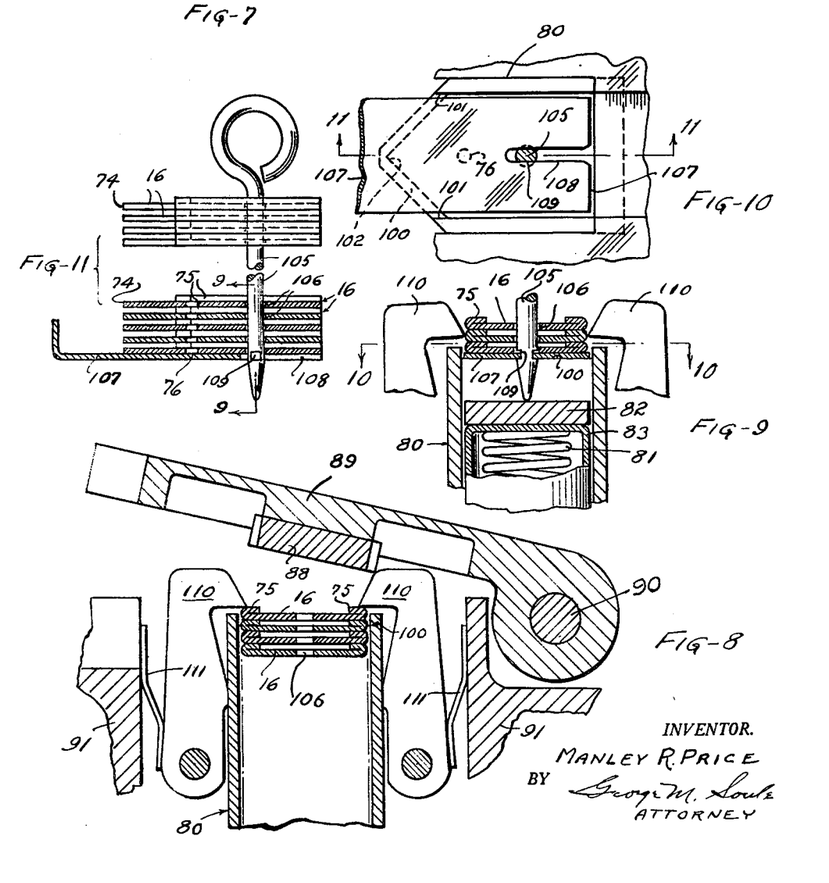
Fig. 8 is a further enlarged scale (double actual size) sectional fragmentary view similar to Figure 7 of the magazine with an insert top guide and magazine cover device in elevated (abnormal) position.
Figs. 9, 10 and 11 are enlarged fragmentary detailed views, partially in section, taken at right angles to one another showing a preferred loading system and apparatus and taken respectively on lines 9—9 of Fig. 11, 10—10 of Fig. 9, and 11—11 of Fig. 10.

The magazines 80 for the inserts 16 are made to conform substantially to the insert contours, as shown by Fig. 13, with adequate working clearance such as will enable properly prepared stacks of inserts to be readily inserted downwardly into the magazines through their open top ends as against the resistance of suitable spring and bolster assemblies such as indicated at 81, 82, Figs. 6 and 9. The bolsters 82, Fig. 6, are hardened steel and contoured similarly to the inserts 16. They may be fastened to respective spring guiding tubes 83 (one shown) telescoping similar tubes 84, each pivotally supported on the inside of the machine body as on a bracket 85. That pivotal arrangement for spring etc. assemblies facilitates placement thereof into working positions in the magazines as will be evident, allowing normally very long low scale springs to be used so that the upward feeding force of each spring will not be too small at any time. The weight of the stack of inserts decreases as the effective strength of the spring decreases.

The lowermost insert 16 of each stack rests on the bolster plate 82 and the uppermost is pressed against the associated hardened steel wear plate 88 carried on a movable cover 89 for the magazine. The cover is preferably pivoted as at 90 to its pusher plate guide bracket casting 91. The brackets 91 are fastened securely to the table steps 10 and provide precision guides for the pusher plates 71 in a suitable manner.

The pusher plates 71 are preferably connected to their operating rockshafts 47 by linkages such as shown by Figs. 1 and 6. The latter view shows a pusher plate 71 connected to a support 92 slidable in the bracket 91 which may include a fixed cover section 93 carrying a pivot 94 for a two part lever 95. The lever 95 pivotally carries a link 96 pivotally connected to the support 92 for the pusher plate 71; and the lever 95 is attached by another link 97 to an upstanding lever arm 48' secured on the rockshaft 47. With that arrangement there is only an insignificant power loss in transmitting the output of the treadle and cam mechanism 60 to the feed slides, sliding friction being practically minimized.

The upper end of each magazine 80 (see Figs. 10 and 12) is cut away in stepped formation as indicated at 100 and 101 so that with the flange portions 75 of the topmost insert 16 in face-to-face contact with the wear plate 88 of cover 89 the point 74 and the under face of said insert amply clear the step surface 100. Thereby the inserts can be safely pushed out of the magazine without likelihood of jamming despite a tolerable amount of malformation on part of the inserts such as can be expected when the inserts are made as metal stampings. As can be most easily understood with reference to Fig. 12, if the inserts 16 were all to be inverted, i. e. positioned with their flange sides down, then the insert which is next-to-the-top (such as the one illustrated in full lines in Fig. 12) would occasionally have its leading portion defining the point 74 at a sufficiently high elevation in relation to the shoulder surface portion 102 of the top of the magazine so that jamming could occur by reason of two inserts trying to leave the magazine simultaneously (friction feeding effect).

For loading the magazines 80 with inserts 16 the latter are preferably assembled in stacks, for example about six inches long, in mutually registering relationship on a rod such as partially shown at 105 in Figs. 9, 10 and 11 engaging openings 106 of the inserts and retained on the rod as by a plate 107 slotted at 108, Fig. 10, detachably to engage the rod at paired notches 109. The plate 107 thus serves in place of the load retainer element of a clip-type magazine loader such as may, of course, be used.

The stack of inserts with the retainer 107 is placed over the top of the magazine as shown by comparison of Figs. 9 and 10; and then the loading plate 107 is slid out from under the stack allowing the inserts to come into contact with the bolster 82 (see Fig. 9) as the rod is withdrawn. The stack of inserts is then shoved down into the magazine past retainer pawls 110, Figs. 8 and 9, described later.

Another method would be to provide an especially small hole 106 in the insert which defines the bottom of the stack and a screw thread on the lower end of the rod 105 to engage that hole. Thus the rod thread would be unscrewed from engagement with the lowermost insert by turning the rod after the stack of inserts had been fully placed in the magazine.

To hold the stack of inserts in the magazine 80 until the cover 89 is fastened down as by nut 89' a pair of pawls 110 biased toward each other by suitable springs 111 are provided in position to be cammed back by the oncoming inserts, whereupon the pawls finally overhang the topmost one of the stack as in Fig. 8. When the cover 89 is lowered to the position shown by Fig. 7 the topmost one of the stack of inserts is lowered slightly out of contact with the pawls by abutment with the wear plate 88. Therefore the pawls need not be shoved back out of insert-retaining position by the cover; and in case the cover is raised for inspection or for any reason none of the inserts 16 will be ejected upwardly out of the magazine.

Figures 14, 15:
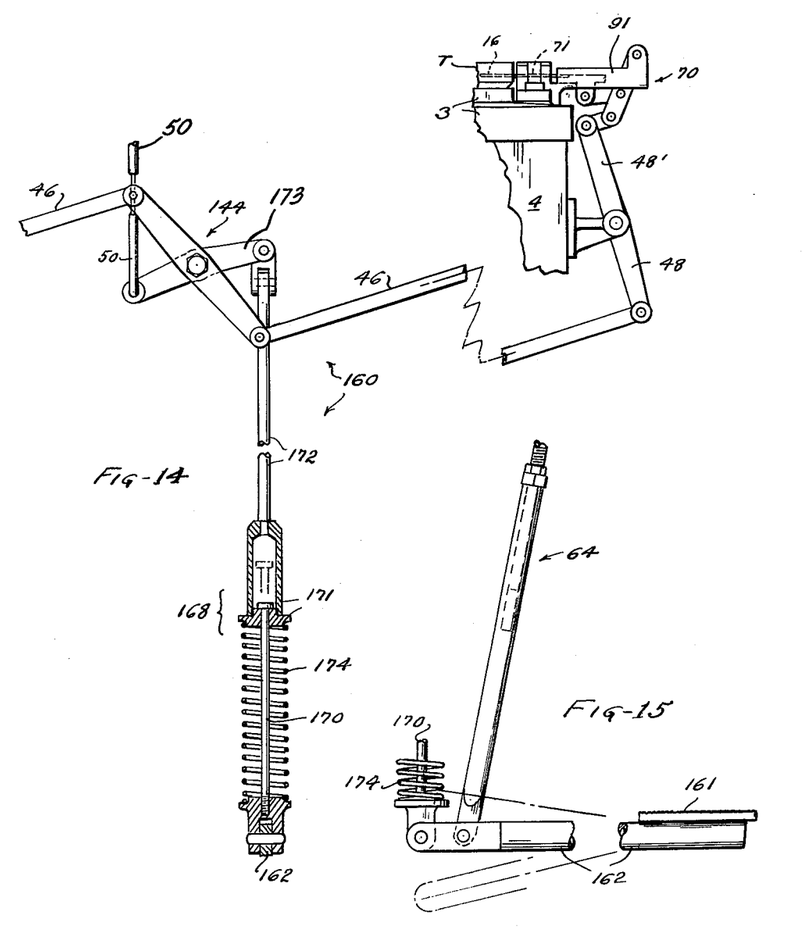
Figs. 14 and 15 are fragmentary views corresponding generally to Figs. 3 and 4 respectively, showing a modified treadle-operated mechanism for proper sequential application of screw-holding inserts and screws to the tile.

Referring to Figs. 14 and 15 these views illustrate an alternative arrangement for operating the cam plate mechanism 42, 43 etc. shown by Figs. 3 and 4 while insuring the proper described sequence of operations on the tile. In Fig. 14 the treadle lever 162 is connected to the somewhat modified feed slide and hold-down-device operating rocker lever 144 by a collapsible push rod assembly 168 permitting yieldingly opposed lost motion. Specifically a rod 170 is normally in the illustrated position in respect to a hollow crosshead 171 connected by a stiff rod 172 directly to a rigid arm 173 of the operating lever; and while the treadle lever is being raised to its full-line-illustrated position the spring 174 acts to transmit the necessary tile-insert-propelling force without collapsing. As soon, however, as the inserts are driven home into the tile and the hold-down devices 40 engage the tile the continued upward swing of the treadle lever then compresses the spring 174, permitting elevation of the power mechanism 20 through the rod 64 as already described.

It might be noted by reference to Fig. 6 that the inserts 16 are preferably driven slightly beyond the receiving edge surfaces of the tile T so that they will never interfere with removal of the tile from the subject machine or prevent snug edge to edge erection of the tile.

It will be apparent that the subject machine does not have to stand upright although that is the most advantageous position thus far found for its use.

I claim:

1. A portable machine for starting headed fastening screws into work pieces adapted for attachment to a building or the like by screws, said machine comprising a relatively lightweight metal frame means having a supporting surface for the work and means to locate the work thereon, means on the frame and opening through the supporting surface forming a set of mutually parallel guides for the screws, a corresponding set of rotary screw driver tools aligned with the guides, a chassis having bearings supporting the tools for rotary movement and restraining them against axial movement relative to the chassis, an electric motor and power transmission means on the chassis, said transmission means comprising flexible belts connected to the tools for turning them simultaneously, means for moving the chassis toward the work supporting surface to drive the screws into the work, and an adjustable stop between the frame means and the chassis for limiting the depth of penetration of the work by the screws.

2. A machine for starting headed fastening screws into tile of relatively frangible nature prior to erection or final placement and for providing adequate tile-retaining shoulder areas for the screws: comprising means for locating the tile in a predetermined position, screw-holding-tab supply magazines disposed adjacent edge portions of the tile as located by said means, feed slide devices propelling the tabs one by one from respective magazines edgewise of the tabs into the tile, slidably mounted screw driving mechanism arranged to propel screws into the tile and through the tabs, and a common means arranged and constrained to operate first the feed slide devices and then the screw driving mechanism as said mechanism is moved toward the tile.

3. A machine for preparing relatively frangible tile for screw-fastening erection or final placement: comprising a support with means definitely locating a tile thereon, magazines and associated feed slide mechanisms associated with the support adapted for supplying and inserting relatively flat tab elements edgewise of themselves into edges of the tile, screw driving mechanism including rotary screw drivers slidably mounted with respect to the support and adapted and arranged to be driven to propel tile-fastening screws through the inserted tabs and into the tile, and actuating mechanism adapted and constrained first to operate the feed slides for insertion of the tab elements and then to cause the screw drivers to become active to perform their stated functions.

4. A machine according to claim 3 wherein said actuating mechanism comprises a treadle means a cam and follower connection between the treadle means and the feed slide mechanisms to operate the same during a partial stroke of the treadle means the cam and follower then becoming ineffective to further move the feed slides, and an operating connection between the treadle means and the screw drivers separate from the cam and follower connection and becoming active during the remainder of the stroke of the treadle means.

5. A machine according to claim 3 wherein said actuating mechanism comprises treadle means having an operating spring connection with the magazine feed slide mechanisms, one of the latter has motion limiting means so arranged that after insertion of the tabs the spring is strained by further motion of the treadle means whereby to become ineffective on the feed slides, and means to enable further movement of the treadle means to advance the screw drivers.

6. A machine for starting headed fastening screws into tile or the like: comprising a frame having a main-tile-face-supporting surface and tile-edge guide means for locating a tile thereon, rotary screw driving tools mounted to the frame and with their rotational axes normal to the principal plane of the supported tile, means for rotating the tools, guideways for the screws aligned with the tools, extending through the tile supporting surface and mounted to the frame, means for moving the tools along their said axes for starting the screws into the tile, and means acting to engage and hold the tile and to prevent movement of the tile in the direction of axial movement of the tools.

7. The machine according to claim 6 wherein the means for preventing movement of the tile in the direction of movement of the screw driving tools moves from a position clear of the tile toward and against the tile face which lies opposite from the one into which the screws are driven.

8. A machine for starting headed fastening screws into tile or the like: comprising a frame having a main-tile-face-supporting surface and tile-edge guide means for locating the tile thereon, a screw driving power mechanism comprising a plurality of torsionally interconnected screw driving tools with their rotational axes normal to the principal plane of the supported tile and a motor for driving the tools, guides on the frame for the screws aligned with the tools, means for moving the tools along their said axes for starting the screws into the tile, and means operated by the tool moving means and engaging the tile in a manner to prevent movement of the tile in the direction of movement of the tools.

9. A machine for inserting fasteners including screws into acoustical or other tile: comprising a device having a main supporting surface for the tile and having tile-edge-engaging guides to locate the tile accurately on said surface, slide feed mechanism on the device, operating means therefor adapted and arranged to drive screw receiving tabs into edge portions of the tile when located as mentioned, power operated multiple spindle screw driver mechanism adapted and retractable arranged to insert the screws into the tile through the tabs, and means operated by one of said mechanisms for engaging and holding the tile against the main tile supporting surface during insertion of the screws.

10. In a machine of the class described, means supporting and locating a tile made of relatively penetrable material by engagement with a main face and two relatively intersecting edges of the tile, and a feed slide mechanism associated with said means and positioned to drive relatively stiff tab elements into edge portions of the tile.

11. A machine arranged for inserting fastener-engaging tabs edgewise into tile or the like, comprising: frame means to support the work, a feed slide adjacent to the work for inserting the tabs into the work, a magazine for the tabs cooperating with the feed slide, said magazine comprising a guide for the tabs, a tube telescoping the guide and having a follower for the tabs, another tube telescoping the first tube, a compression spring contained by the two tubes and acting in a direction to separate them, the second tube being pivotally connected to the frame, and the tubes being collapsible on themselves by opposing the force of the spring to an extent enabling the spring and tube assembly to be detached from the tab guide while still pivotally connected to the frame.

12. A portable machine for starting headed fastening screws into acoustical or other tile prior to final placement or erection of the tile: comprising a light weight hollow body having a tile-supporting top surface, relatively intersecting upright surfaces adjacent thereto adapted to locate the tile on the first mentioned surface through engagement with at least two correspondingly related and relatively adjacent edges of the tile, a chassis located below the supporting surface and carrying a set of rotary screw drivers and a mechanism for driving them in unison, means rigid with said body, in fixed mutually parallel relationship, comprising guides for screws opening adjacent the under face of the supported tile, said guides receiving the screw-engaging ends of the screw drivers, means guiding the chassis, and means advancing the chassis a controlled distance toward the tile supporting surface.

13. A portable machine for starting headed fastening screws into acoustical or other tile prior to final placement or erection of the tile; comprising a table having a main tile-supporting surface, means including two sets of approximately upright tongues at horizontally opposite margins of said main surface, the tongues of each set being mutually spaced apart horizontally and the means being adapted to locate the tile on said surface through engagement with at least three relatively intersecting edges of the tile, the spacing between the tongues of each set being sufficient to enable manual placement of the tile by digital engagement with associated relatively opposite edge surfaces of the tile, multiple spindle power mechanism below the supporting surface and including a torsionally interconnected set of rotary screw drivers guided for raising and lowering movement relative to the table, the screw drivers being adapted and arranged to torsionally engage and propel a plurality of screws simultaneously into the tile while supported on said table surface, guide means to which the set of rotary screw drivers is mounted, and means relatively moving the rotary screw driver set along the guides.

14. A portable machine for starting headed fastening screws into the face apertures of perforated acoustical tile prior to final placement or erection of the tile: comprising a hollow sheet metal stand having a rigid top plate at its top portion forming a table for receiving tile, face-down, the top plate having means projecting upwardly therefrom and positioned to locate the tile in horizontal position on the table in two relatively intersecting vertical plates, the plate having vertical screw receiving guide bores therethrough aligned with certain of the tile apertures when the tile engages the locating means, vertical guide bars rigidly supported by the top plate and extending downwardly therefrom within the hollow stand, a chassis slidable on the guide bars, a set of vertically disposed screw drivers on the chassis extending into respective screw receiving bores and guided thereby, an electric motor supported by the chassis and transmission means connecting the motor to all the screw drivers for turning them in unison, and means including a treadle operated mechanism supported by the stand and connected to the chassis for elevating the motor, transmission means and screw drivers as a unit for simultaneously starting the screws into the tile.

15. A machine for starting headed fastening screws into tile of relatively frangible nature prior to erection or final placement: comprising a support and tile-edge-engaging means locating the tile in three normally and mutually intersecting planes, a tab magazine in fixed relation to the support for screw-holding insert tabs, stiff enough and thin enough to penetrate the edge portions of the tile but readily penetrable by screws, means forcing a tab from a magazine edgewise of the tab into the tile, means receiving and guiding screws, and means for driving the point of a screw received in the guiding means through the tab crosswise of its principal plane and into the tile.

16. A machine assemblage accurately placing screws and comprising a frame, a work support plate carried by the frame, work positioning means associated with the work support plate, screw driving means mounted to the frame below the work support plate, the mounting thereof comprising guides slidably receiving the screw driving means and screw receiving guideways opening through the work support plate, the screw driving means axially aligned with the screw receiving guideways, with the screw engaging portion thereof entered in the lower part of the screw receiving guideway.

MANLEY R. PRICE.

REFERENCES CITED

The following references are of record in the file of this patent:

UNITED STATES PATENTS

| Number | Name | Date |
|---|---|---|
| 480,530 | Tobey | Aug. 9, 1892 |
| 689,813 | Decow et al. | Dec. 24, 1901 |
| 1,578,232 | Ferris | Mar. 23, 1926 |
| 1,624,609 | Maise | Apr. 12, 1927 |
| 1,683,815 | Brown et al. | Sept. 11, 1928 |
| 1,858,677 | McKnight | May 17, 1932 |
| 1,944,596 | Farr et al. | Jan. 23, 1934 |
| 1,991,467 | Sawin | Feb. 19, 1935 |

FOREIGN PATENTS

| Number | Country | Date |
|---|---|---|
| 603,019 | Great Britain | June 8, 1948 |